(12) United States Patent
Labaton

(10) Patent No.: US 8,132,012 B2
(45) Date of Patent: Mar. 6, 2012

(54) METHOD AND APPARATUS FOR THE SECURE IDENTIFICATION OF THE OWNER OF A PORTABLE DEVICE

(75) Inventor: Isaac J Labaton, Macabim (IL)

(73) Assignee: Cidway Technologies, Ltd., London (GB)

( * ) Notice: Subject to any disclaimer, the term of this patent is extended or adjusted under 35 U.S.C. 154(b) by 104 days.

(21) Appl. No.: 12/340,225

(22) Filed: Dec. 19, 2008

(65) Prior Publication Data

US 2009/0100508 A1 Apr. 16, 2009

Related U.S. Application Data

(63) Continuation of application No. 11/998,729, filed on Nov. 30, 2007, which is a continuation of application No. 11/252,980, filed on Oct. 17, 2005, now Pat. No. 7,565,297, which is a continuation of application No. 09/913,815, filed as application No. PCT/IB00/00319 on Feb. 25, 2000, now Pat. No. 6,957,185.

(30) Foreign Application Priority Data

Feb. 25, 1999 (IL) .......................................... 128720

(51) Int. Cl.
*G06F 21/00* (2006.01)

(52) U.S. Cl. ...................................... 713/170; 713/184
(58) Field of Classification Search .......... 713/176–180, 713/184
See application file for complete search history.

(56) References Cited

U.S. PATENT DOCUMENTS

| 5,297,206 A | 3/1994 | Orton |
| 5,422,953 A | 6/1995 | Fischer |
| 5,481,611 A | 1/1996 | Owens et al. |
| 5,592,553 A * | 1/1997 | Guski et al. ................... 713/159 |
| 5,604,803 A | 2/1997 | Azis |
| 5,606,609 A * | 2/1997 | Houser et al. ................. 713/179 |
| 5,629,981 A | 5/1997 | Nerlikar |
| 5,655,007 A | 8/1997 | McAllister |
| 5,661,807 A | 8/1997 | Guski et al. |
| 5,671,279 A | 9/1997 | Elgamal |
| 5,742,684 A | 4/1998 | Labaton |
| 5,841,871 A | 11/1998 | Pinkas |
| 5,963,646 A | 10/1999 | Fielder et al. |
| 5,982,891 A | 11/1999 | Ginter et al. |
| 6,029,150 A | 2/2000 | Kravitz |
| 6,067,621 A | 5/2000 | Yu et al. |
| 6,069,647 A | 5/2000 | Sullivan |
| 6,085,320 A | 7/2000 | Kaliski, Jr. |

(Continued)

OTHER PUBLICATIONS ("Apparent Weaknesses in the Security Dynamic Client/Server protocol", Adam Shostack, Homeport.org, Oct. 1996).*

*Primary Examiner* — Gilberto Barron, Jr.
*Assistant Examiner* — Simon Kanaan
(74) *Attorney, Agent, or Firm* — Snell & Wilmer, LLP

(57) ABSTRACT

An authentication system is provided that includes a portable device and a decryption node. An individual uses the portable device, such as a portable device like a cell phone to compute a challenge and a response. The challenge and response is sent to a decryption node. In response, the decryption node computes a presumed response and compares the presumed response to the response of the portable device, in order to authenticate the individual associated with the portable device.

15 Claims, 3 Drawing Sheets

U.S. PATENT DOCUMENTS

Figure 1:
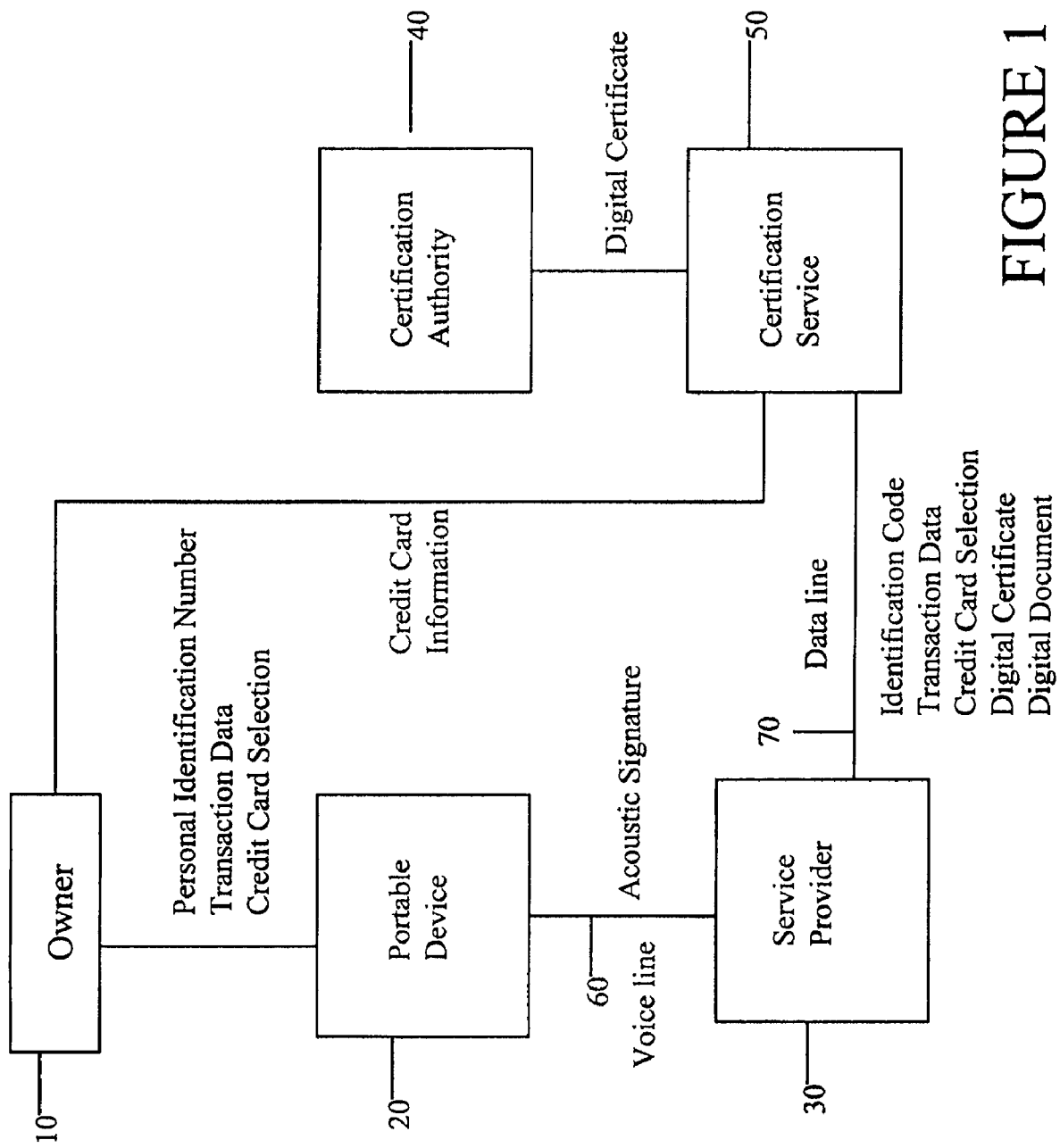

| | | | |
|---|---|---|---|
| 6,102,287 | A | 8/2000 | Matyas, Jr. |
| 6,105,133 | A | 8/2000 | Fielder et al. |
| 6,148,404 | A | 11/2000 | Yatsukawa |
| 6,266,418 | B1 | 7/2001 | Carter et al. |
| 6,292,437 | B1 | 9/2001 | Beard |
| 6,292,896 | B1 | 9/2001 | Guski et al. |
| 6,332,133 | B1 | 12/2001 | Takayama |
| 6,418,472 | B1 | 7/2002 | Mi et al. |
| 6,424,718 | B1 | 7/2002 | Holloway |
| 6,434,561 | B1 | 8/2002 | Durst et al. |
| 6,434,700 | B1 | 8/2002 | Alonso et al. |
| 6,470,448 | B1 | 10/2002 | Kuroda et al. |
| 6,470,453 | B1 | 10/2002 | Vilhuber |
| 6,607,136 | B1 | 8/2003 | Atsmon et al. |
| 6,671,813 | B2 | 12/2003 | Ananda |
| 6,704,715 | B1 | 3/2004 | Rosset et al. |
| 6,745,326 | B1 | 6/2004 | Wary |
| 6,912,659 | B2 | 6/2005 | Labaton |
| 6,957,185 | B1 | 10/2005 | Labaton |
| 6,957,199 | B1 | 10/2005 | Fisher |
| 7,039,802 | B1 | 5/2006 | Eskicioglu et al. |
| 7,181,621 | B2 | 2/2007 | Labaton |
| 7,231,025 | B2 | 6/2007 | Labaton |
| 7,353,211 | B2 | 4/2008 | Hans et al. |
| 7,353,541 | B1 | 4/2008 | Ishibashi et al. |
| 2001/0011350 | A1 | 8/2001 | Zabetian |
| 2001/0034832 | A1 | 10/2001 | Hashikura |
| 2002/0002678 | A1 | 1/2002 | Chow et al. |
| 2002/0059144 | A1 | 5/2002 | Meffert et al. |
| 2002/0120473 | A1 | 8/2002 | Wiggins |
| 2002/0191765 | A1 | 12/2002 | Labaton |
| 2006/0005028 | A1 | 1/2006 | Labaton |
| 2007/0219926 | A1 | 9/2007 | Korn |

\* cited by examiner

METHOD AND APPARATUS FOR THE SECURE IDENTIFICATION OF THE OWNER OF A PORTABLE DEVICE

CROSS-REFERENCE TO RELATED APPLICATIONS

This application is a continuation of and claims priority to U.S. patent application Ser. No. 11/998,729 filed Nov. 30, 2007, which is a continuation of, and claims priority to U.S. patent application Ser. No. 11/252,980, U.S. Pat. No. 7,565,297, filed Oct. 17, 2005, which is a continuation of, and claims priority to U.S. patent application Ser. No. 09/913,815, U.S. Pat. No. 6,957,185, filed Aug. 17, 2001, by Isaac J. Labaton, which is a 371 of PCT/IB00/00319, filed Feb. 25, 2000 claiming priority to Israel patent application 128,720 filed Feb. 25, 1999.

TECHNICAL FIELD

The present invention generally relates to methods for identification, and more specifically, to methods for remotely identifying the owner of a portable device over a voice line.

BACKGROUND OF THE INVENTION

Various service providers (e.g., financial institutions, banks, brokers, merchants, etc.) are often involved in transactions requiring the identification and validation of a remote entity (e.g., an individual, organization, smart card, message, account, etc.) and the certification of transaction data. These service providers often provide their services to remote entities over the Internet in what is often referred to as electronic commerce (e-commerce). One of the limitations of e-commerce is that the remote entity requires a personal computer or similar device to complete the transaction. In addition, the remote entity requires the necessary skills for utilizing the Internet.

Recently, there have been intense efforts to develop technology for bridging the gap to remote entities that do not have access to the Internet in order to make e-commerce more widely available. This emerging technology (e.g., Web Telephony Engine of Microsoft) often makes use of a voice browser. A voice browser is software that executes on a personal computer or similar device, and "understands" spoken instructions by utilizing speech recognition technology and "reads out" text by using text-to-speech technology. The voice browser is used by a remote entity to browse the internet over a voice line such as a telephone line. Thus, voice browsers enable a remote entity to perform an internet transaction over a phone. In order to identify himself, the caller or consumer can use a smart card, or other known technology. However, these identification activities are limited in that additional hardware is required (e.g., a card reader) and certain telephones (e.g., public phones) cannot be utilized.

Regardless of whether the transaction takes place over a telephone, the Internet (including voice over IP) or other telecommunications media, it is important for service providers to ensure during each transaction that the remote entity is not an impostor. Accordingly, service providers often employ various identification devices to identify and validate remote entities, these devices being referred to herein as Identification Devices. For ease of discussion, a remote entity authorized to engage in transactions, but perhaps not yet identified and/or authenticated by an Identification Device for a particular transaction, is referred to herein as an "Authorized Remote Entity" or "Authorized Entity."

One method commonly known in the art and employed by Identification Devices for securely identifying a remote entity is to add "authentication" to an otherwise normal identification process. Authentication is typically accomplished by providing an additional piece of information to an Identification Device, e.g., a secret code, along with identification information. This additional information then may be used to corroborate that the identification is accurate and that the remote entity is not an impostor attempting to impersonate an authorized entity. The additional piece of information is often a secret code or a password (e.g., PIN), but also may be a Dynamic Code, preferably computed using a software implemented algorithm. Alternatively, the additional information may be provided by a token (e.g., Bio-Token) carried by the entity (e.g., individual) to be identified.

Non-variable (i.e., constant or static) information or data (e.g., PIN) can only add limited security to the identification process because a static piece of information eventually may become known to a third party (e.g., potential attacker/impostor/eavesdropper) in which case an authorized entity can easily be impersonated. On the other hand, authentication by means of a variable piece of information (referred to herein as a Dynamic or One Time Code) provides enhanced security.

Currently known methods of authentication which use a Dynamic or One Time Code typically require a prior step of identifying the remote entity to the Identification Device, e.g., by providing a name (e.g., a login name), a serial number, an additional fix code, etc. as part of a message transmitted from a Remote Entity to an Identification Device. This constant part of a message will be referred to herein as an Identification Message. Thus, a method commonly employed by an Identification Device to securely identify a Remote Entity by authentication typically comprises the three following steps:

1) Identification: identify who the Remote Entity is supposed to be, by receiving a constant (non-variable, or at least non-constantly-variable) piece of information, referred to herein as an Identification Message;

2) Database Search: the Identification Devices searches a database containing the Authorized Entity's secret information or computing keys, to compute a dynamic piece of information (referred to herein as a Valid Dynamic Code) which is associated with and expected from the Authorized Entity at that particular moment; and 3) Authentication: the Identification Device compares the Valid Dynamic Code (computed at the Identification Device) with a Dynamic Code received from the Remote Entity (referred to as the Received Dynamic Code) to check if both codes match; if so, the Identification Device corroborates the identification of the Remote Entity as being the Presumed Entity.

A variation of the above-described authentication method is referred to as the Challenge and Response method, comprising the following steps:

1) The Remote Entity is identified (as described in step 1 above);

2) The Remote Entity receives a Challenge generated and sent by the Identification Device and computes a Response, the Response playing the role of a Dynamic Code;

3) The Identification Device, after identifying the Remote Entity (the Pre-Authentication Identification), searches a database containing the Authorized Entity's secret information or computing keys, to determine the expected response to the challenge, for that Remote Entity at that moment.

Each of the authentication schemes described above requires the Identification Device to employ a database or look-up table. Naturally, each database must be maintained and updated, which creates problems associated with the management of keys, synchronized database updates, etc. Furthermore, these problems become acute when a service provider utilizing an authentication process has a multitude of Identification Devices disseminated through several countries.

Another problem associated with conventional schemes for Remote Identification is the possibility of "repudiation" by an identified and authenticated Remote Entity. For example, a Remote Entity, which has been identified and authenticated as being an Authorized Entity, may later deny the genuineness of a particular communication or event under scrutiny. To illustrate, in the case of a Gambling Service Provider (although identification and authentication techniques may apply to any service provider, Gambling Service Providers are used for this example), Remote Entities (e.g., gamblers) may place bets from remote locations and pay for those bets using Credit Cards. Naturally, before a particular Remote Entity places any bets, the Gambling Service Provider identifies and authenticates that Remote Entity by a procedure similar to those described above. Once the bets have been placed, one of the Remote Entities wins a prize, while all of the remaining Remote Entity gamblers lose. This situation presents an opportunity for any number of losing Remote Entities to repudiate their particular betting transaction, including the identification and authentication process, claiming that they never made the transaction/bet, and that the Gambling Service Provider fabricated the transaction or made a mistake. Because each Remote Entity is authenticated by the Provider's Identification Device, and further because the provider includes a database containing secret information, the Provider has the capability to compute as many Valid Dynamic Codes as the Gambling Service Provider may desire, and an unscrupulous Gambling Service Provider thereby has the ability to fabricate transactions. Accordingly, when a Remote Entity repudiates a transaction, there is no way to prove whether the Gambling Service Provider fabricated the transaction or the Remote Entity has repudiated a valid transaction. Of course, if all the losing Remote Entities repudiate their transactions, the effect on the Gambling Service Provider may be disastrous.

As illustrated in the example above, present methods of authentication intrinsically are subject to the negative effects of transaction repudiation, due to the fact that the receiving/identifying/authenticating side of each transaction has the capability to compute a secret Dynamic Code as accurately as the Remote Entity.

A further drawback of authentication methods known in the art and described above is the fact that a Remote Entity is trackable. In other words, an eavesdropper may follow every transaction made a particular Remote Entity because that Remote Entity transmits the same constant identification information for every transaction. This ability to track a Remote Entity creates a lack of security and privacy for many Remote Entities (e.g., especially government officers, ministers, police officers, etc.).

In addition, another problem encountered is the impersonation of a service provider by a third party. For example, a third party may impersonate a service provider in order to obtain information from the remote entity without the remote entity's knowledge. The third party may then use the obtained information to complete transactions to the detriment of the remote entity.

Thus, a new method and apparatus for the identification of a remote entity is needed that overcomes the limitations and problems of the prior art.

BRIEF DESCRIPTION OF THE DRAWING FIGURES

Figure 2:
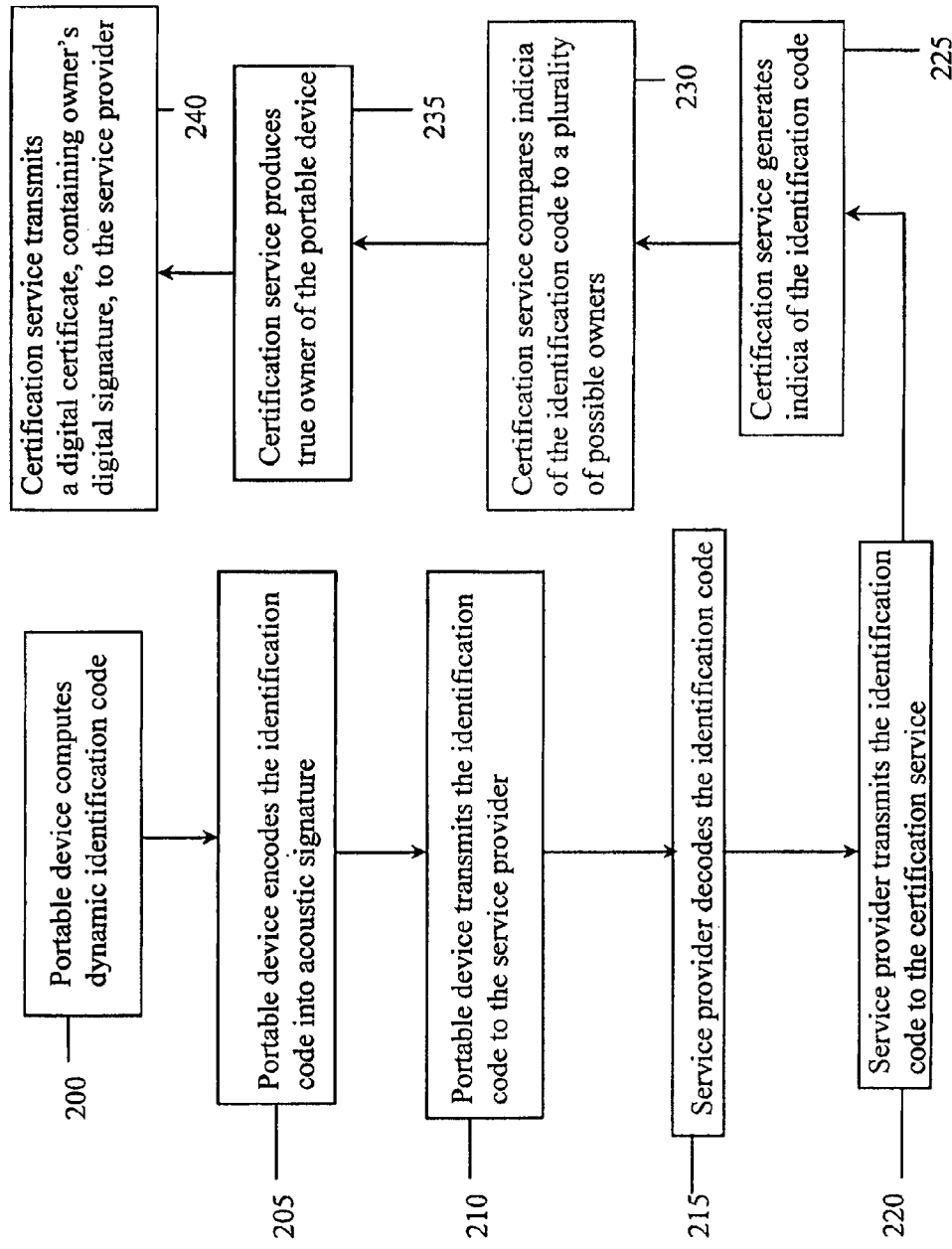
Figure 3:
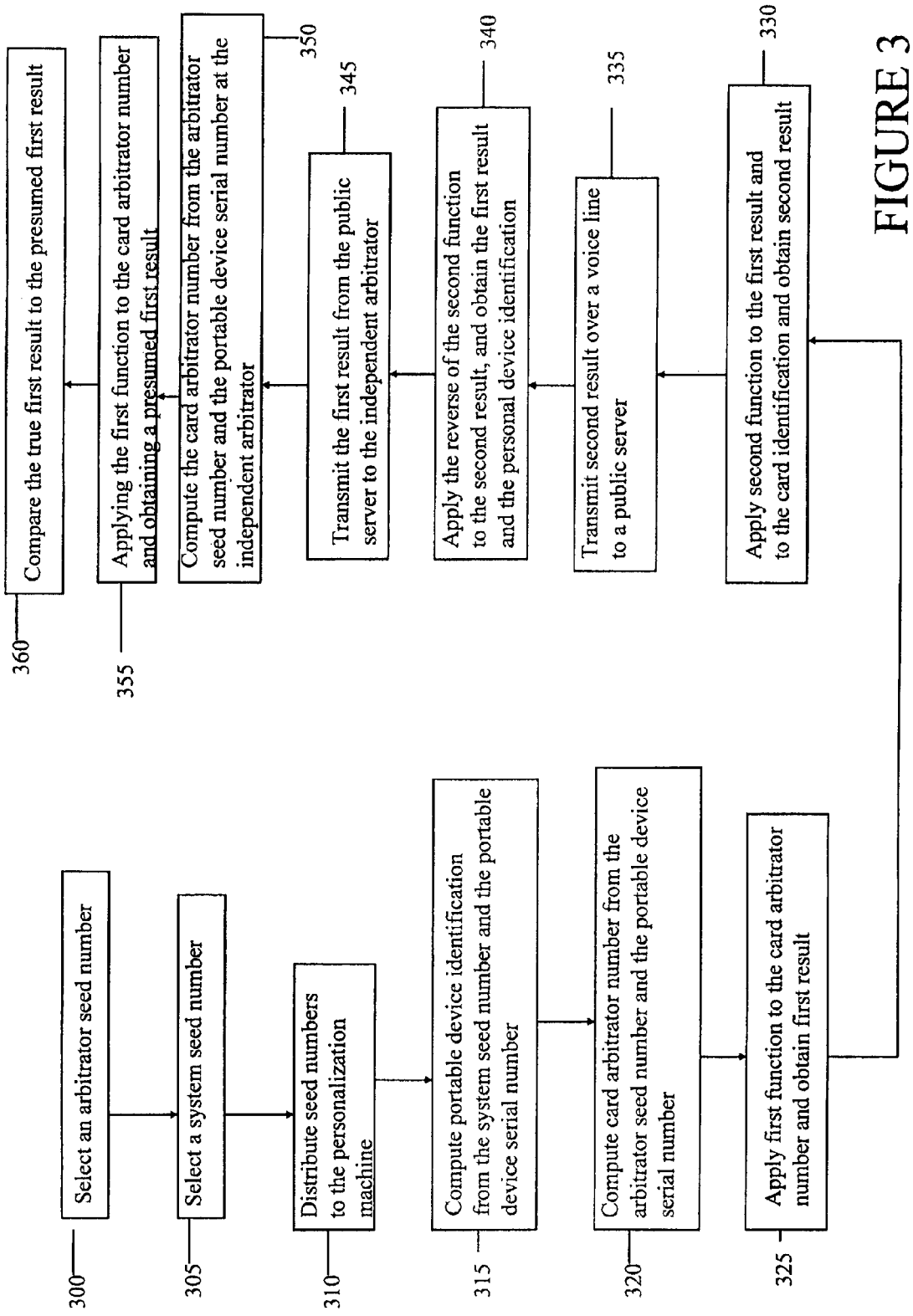

FIG. 1 is a block diagram of an exemplary system for performing the methods of the present invention; and FIG. 2 is an exemplary flow diagram of an embodiment of the identification method of the present invention; and FIG. 3 is an exemplary flow diagram of an embodiment of the identification method with arbitration of the present invention.

DETAILED DESCRIPTION

The present invention provides methods for the secure identification of the owner of a portable device by a service provider, wherein the portable device may be in communication with the service provider over a voice line such as a telephone line, voice over IP, a data line or the like, and the portable device does not require a personal computer, card reader, or the like. Furthermore, the methods of the present invention may provide for one-way, non-repudiable, non-trackable identification of the owner of a portable device and for the arbitration of a disputed transaction between the owner of a portable device and a service provider.

Referring now to FIGS. 1 and 2, in accordance with a first embodiment of the present invention, a small hand-held device 20 (portable device) may be issued to each entity 10 (i.e., owner of the portable device), who desires to perform secure and certified Internet transactions over a voice line, including a regular telephone that may be a public telephone. As a one time set-up procedure, a certificate (e.g., X.509) from an accepted certification authority 40, such as Verisign or similar authority, may be requested such that the third party certification service 50 will be able, upon the request of the service provider 30, to generate digital documents certified by the certification authority procedures (e.g., PKCS#7) and specific keys, given to the person and wherein the respective X.509 is also stored in the certification service's database.

Portable device 20 may require a personal identification number (PIN) to be entered, and the portable device may permit a limited number of consecutive wrong PINs (e.g. 3 or 10) before the portable device autolocks. Thus, only the legitimate owner has the capability to activate portable device 20. Whenever an entity desires to perform a secure Internet transaction through a regular phone, the entity may use the portable device. Since the portable device was previously associated with the entity at one of the third party certification service's databases, the portable device may be used to identify the authorized and legitimate device's owner in the following manner.

Initially, the entity may be required to enter a PIN into the portable device as previously described. The PIN ensures that only the rightful owner of the portable device will be able to use the portable device, thus preventing impostors from using the device.

Next, the portable device will compute a secure and dynamic identification code (step 200) every time the device is activated (e.g., when a key is pressed) as will be described below. The portable device will be capable of accepting transaction data (e.g., transaction amount, type of transaction, account number, destination phone number) that is locally entered by the entity at the time of the transaction by means of a key-pad or similar input device of the portable device.

The portable device may be capable of encrypting the transaction data in accordance with conventional encryption techniques. The portable device will be configured to encode the secure identification code and the encrypted transaction data to sound (the acoustic signature) (step 205). The remote entity may contact the service provider by using a telephone or personal computer over a voice line 60 or other data line. An example of a voice line is a standard telephone line as found in a traditional public switched telephone network (PSTN). The remote entity will transmit the acoustic signature through the voice line, whereas the sound is converted to an electromagnetic signal at the microphone of the voice line and transmitted through the PSTN to the service provider in the same manner as any utterance that may be made by the caller (step 210). Next, the acoustic signature may be recorded (i.e., digitized and stored in a file) at the service provider facilities. The reverse process to the encoding process is carried out (also referred to as de-codification) on the acoustic signature such that the identification code and the encrypted transaction data are recovered (step 215). Alternatively, if the remote entity is contacting the service provider server from a personal computer, then this de-codification is made at the remote entity's personal computer by a software module, which was previously downloaded. In a preferred embodiment, the string of digits referred to as the identification code and the transaction data is encrypted and/or hashed, according to the standards and use of the e-commerce certification authorities such as the SSL protocol or VPN methodology (herein the encrypted or hashed data is referred to ask the client query), and the client query is transmitted to a third party, referred to as the certification service, via a data line 70 (step 220).

The certification service decrypts the client query and indicia of the identification code and transaction data are recovered from the client query (step 225). Next, the certification service compares the indicia of the identification code to a plurality of identification codes (step 230), and the certification service identifies the specific portable device and the owner of the device (step 235). The certification service decrypts the encrypted transaction data and queries a database where the personal keys of the small hand-held device's legitimate owner are stored and prepares a signed document according with the procedures recommended and in use by the certification authorities. The signed document is in conformance with the procedures of the certification authority with the result that the service provider receives a secure digital document that includes all the necessary data to perform a transaction which may include the customer's X.509, according to the usage of the e-commerce certification authorities (e.g.: PKCS#7) wherein the remote entity was only in telephone contact with the service provider (step 240).

The present invention further provides for remote, credit card based, over-the-phone transactions in the following manner. Initially, a small hand-held device (portable device) may be issued to each entity, which desires to perform secure and certified Internet transactions, that are credit card based, from a regular phone. As a one time set-up procedure, the entity will provide an authorization to use one or several of their credit cards for paying transactions according with the procedures stated below, in a way that the certification service will be able, upon the entity's request, as specified below, to deliver digitally signed documents. This set-up procedure will include obtaining all the necessary data, including name of the customer, credit card numbers, expiration dates, address, and, if requested, the X.509 certificate of the customer and/or the facsimile of the hand-written signature of the customer to be stamped and used as described below.

For each transaction (or each transaction session), the entity may be required to enter a PIN into the portable device as previously described. The PIN ensures that only the rightful owner of the portable device will be able to use the portable device, thus preventing impostors from using the device. Next, the portable device will compute a secure and dynamic identification code every time the device is activated as will be described below. The portable device will be capable of accepting transaction data (e.g., transaction amount, type of transaction, credit card selection, destination phone number) that is locally entered by the entity at the time of the transaction by means of a key-pad or similar input device of the portable device.

The portable device may be capable of encrypting the transaction data in accordance with conventional encryption techniques. The portable device will be configured to encode the secure identification code and the encrypted transaction data to sound (the acoustic signature). The remote entity may contact the service provider and transmit the acoustic signature through the telephone's microphone, whereas the sound is converted to an electromagnetic signal at the microphone and transmitted through the PSTN to the service provider in the same manner as any utterance that may be made by the caller. Next, the acoustic signature may be digitized (i.e., stored in a file) at the service provider facilities. The reverse process to the encoding process is carried out (also referred to as de-codification) on the acoustic signature such that the identification code and the encrypted transaction data are recovered. In a preferred embodiment, the string of digits referred to as the identification code and the encrypted transaction data is encrypted and/or hashed, according to the standards and use of the e-commerce certification authorities, (herein referred to as the client query) and whereas the client query is transmitted to a third party, referred to as the certification service.

The certification service decrypts the client query and the identification code and transaction data are recovered from the client query. Next, the certification service compares the identification code to a plurality of identification codes, and the certification service identifies the specific portable device and the owner of the device based upon the comparison. The certification service decrypts the encrypted transaction data and queries a database where the credit card account numbers, addresses, and X.509 certificates of the small hand-held device's legitimate owner are stored and matches the previously made credit card selection with the correct credit card account number. The certification service then may optionally obtain authorization for the transaction from the credit card company associated with the credit card selection. Upon authorization, a signed document is produced according with the procedures recommended and in use by the certification authorities (e.g., PKCS#7). The signed document is in conformance with the procedures of the certification authority and contains the necessary data for the completion of the credit card based transaction. Thus, the service provider receives a secure digital document according to the usage of the e-commerce certification authorities wherein the remote entity was only in telephone contact with the service provider.

Another embodiment of the method of this invention provides for remote, credit card based, over-the-Internet, transactions originated through the phone and referred to as voice-commerce (v-commerce) transactions. Initially, each entity that desires to perform secure, remote credit card based over-the-Internet transactions from a regular phone, will, as a one time set-up procedure, be issued a small hand-held device (i.e., portable device). The entity will provide, as part of the set-up procedure, an authorization to use one or several of the entity's credit cards for paying transactions according with the procedures discussed below, such that a third party, referred to as the certification service, will be able, upon the entity's request, as specified below, to deliver digitally signed documents according with the electronic-commerce standards (e.g., PKCS#7 or other standards) with the necessary content for performing transactions. In addition, as part as the set-up procedure, the entity will provide all the necessary data, including name and addresses of the customer, credit card numbers, expiration dates, and, if requested, the X.509 certificates of the customer and/or the facsimile of the hand-written signature of the customer to be stamped and used as described below.

For each transaction, the portable device may request a PIN to be entered. The initial PIN may be changed by the owner of the portable device at any time. The portable device allows a limited number of consecutive wrong PINs (e.g., 3 or 10) before auto locking itself, therefore, only the legitimate owner has the capability to activate the portable device. When performing a secure credit card transaction over a regular phone, the owner of the portable device should use his portable device, which was associated with the owner on one of the certification service's databases or other issuers' databases. The portable device is able to identify the authorized and legitimate device's owner by requesting the Personal Identification Number. Once the portable device is activated, the portable device is capable of accepting transaction data (i.e., transaction amount, selection of the credit card, etc) locally entered by the customer at the time of the transaction by means of the key-pad of the portable device. When a key is pressed the portable device will compute an identification code and encrypt the transaction data and encode the secure identification code and the encrypted transaction data to sound, whereas the sound, comprising the dynamic and secure identification code and the encrypted transaction data, is referred to as the acoustic signature. Next, the owner of the portable device places a call to a specially designed voice browser server (also referred to as a public server, portal server, or phone enabled internet server) which is able to interpret the customer utterances using speech recognition technologies and text-to speech technologies to read out, for the customer, Internet instructions, such as instructions encoded in hypertext mark-up language (HTML). The voice browser server uses customer originated instructions translated to HTML such as web-browser instructions for browsing the Internet, and enabling the owner of the portable device to perform Internet transaction through the phone. Eventually the owner of the portable device (the customer) will reach a particular merchant's (the service provider) web-site. The customer may eventually select a good to purchase, and indicate at one particular stage of the purchasing procedure the fact that he can perform a secure transaction since he holds a portable device as described above, and at some later time, if requested, the owner of the portable device may decide to send a signed document to the service provider wherein such digital document will contain the necessary information and authorization to perform a credit card transaction for a specific amount. After making voice contact with the voice browser server, and browsing to the correct web-site, the owner of the portable device will send during the calling session, the acoustic signature generated by the portable device through the phone set's microphone, whereas this sound is converted to an electromagnetic signal at the microphone and is transmitted through the PSTN to the voice browser server. At the voice browser server, the acoustic signature may be digitized (i.e., creating a file). The reverse of the encoding process that was performed on the small hand-held device, referred to as the decoding process, is applied to the digitized acoustic signature thus recuperating the dynamic and secure identification code and the encrypted transaction data. Next, the string of digits referred to as the dynamic and secure identification code and the transaction data are encrypted and/or preferably hashed, according to the standards and usage of the e-commerce certification authorities (e.g., SSL or VPN) wherein the encrypted string is referred to below as the client query. The client query is transmitted, over data lines, by the voice browser server to a third party, referred to as the certification service. The certification service decrypts and/or re-checks the integrity and validity of the client query recuperating indicia of the dynamic and secure identification code and the transaction data. The certification service compares the indicia of the identification code to a database of identification codes, and thus identifies the specific portable device and its owner. The certification service will decrypt the transaction data (e.g., the transaction amount) as necessary, and query a database where the credit card account numbers, as well as other pertinent data such as address, and X.509 certificates associated with the portable devices and/or owners of portable devices are stored. Optionally, the certification service obtains authorization for the credit card transaction from the relevant credit card company directly or through a point-of sale machine, and/or through any of the companies who serve as clearing houses for credit card transactions. After obtaining authorization for the credit card transaction from the relevant credit card company, the certification service prepares a digitally signed document (preferably PKCS#7), with the necessary data for the completion of the credit card based transaction, including name of the customer, credit card number, amount of the transaction, expiration date, and, if requested, the digital X.509 certificate of the customer and/or the digital certificate generated by the certification service, and/or the facsimile of the hand-written signature of the customer, in order to fulfill the credit card companies request of signature-on-file. A further variation of the method of this patent is, as above, but instead of credit card based transactions, perform a debit card and/or direct bank account based transaction.

In accordance with another aspect of this invention is a method as above, but instead of a variable, dynamic and secure identification code, the portable device will encode to sound, a fixed, non-variable ID code along with the encrypted transaction data that was encrypted with the customer private key and previously entered in the portable device. The certification service will receive, the decoded acoustic signature, and by means of the fixed, non variable ID code, will query their database for the customer data, including the credit card account numbers, as well as other pertinent data such as address, and if necessary, the appropriate private key's X.509 certificate.

The certification service can now send all of the information (i.e., encrypted transaction data, credit card numbers, X.509 customer certificate used, transaction time and date, and other data such as customer's addresses) which may be signed or not to the portal, merchant, or phone enabled portal, or to whoever requested the transaction certificate, by means of data lines, preferably using VPN methodology.

Referring now specifically to the computation of the dynamic and secure identification code at the portable device and the consequent interpretation of the identification code, according to the method of the present invention, we can refer to several authentication methods, whereas all of the authentication methods are characterized by the transmission of an identification message comprising two parts—one constant part such as a login name, user name, or serial number, etc, and the second part referred to as a password which is preferably variable. Several of these methods are known and in use in the market. A preferable improvement of these procedures, as presented below, is not an authentication method, but rather an identification method, whereas a difference is that the message sent according with this method has no constant part, but, rather the entire message is variable, in order to deliver total privacy to the caller.

Referring now to FIG. 3, a method of identification and arbitration will now be discussed. Since the new system (which includes a multitude of cards or small portable devices and a DECRYPTOR Server) should be a closed system, the first step to be accomplished is the System Differentiation. A new system administrator selects (optionally) a third party to be an independent Arbitrator. The arbitrator and the new system administrator select their respective seed numbers (steps 300 and 305). The seed numbers will be used to initialize the personalization machine (PM) (step 310) and the DECRYPTOR Server, wherein the personalization machine is the device which enters the secret keys into each portable device.

The system administrator preferably selects two trusted officers. Each officer selects a half of the system seed number: a N/2 digit half system seed number. This selection and dongles burning/writing is accomplished by means of firmware: referred to as the seed selection module, which runs on any PC.

As a result, each half of the system seed number remains embedded in a respective dongle. The system has two dongles, each one with half of the system's seed number (N/2 hex-digits each, N hex-digits total, for example, where N=38).

A parallel process of selection of an arbitrator seed number is made by the independent arbitrator (step 300). As a result, the arbitrator will also have two dongles, each one with one half of the arbitrator's seed number (for a total of N hex-digits). Contrary to the system dongles, the arbitrator's dongles will be used to initialize the personalization machine only. Hence, the decryptor server will never know the arbitrator seed numbers, and thus the Identification algorithm of the present invention is non repudiable.

The four dongles are used to initialize the portable machine (PM) in order to burn small portable devices for one specific system. The seed numbers are not stored in the PM's memory, only on the PM's RAM.

Based on the system's seed number, the PM software computes and burns into the small portable device four different numbers, whereas two out of the four are system numbers and the remaining two are small hand-held device specific.

The four numbers are respectively:
The System Module (SM)
The System DES key (SDK)
The Card ID (C_ID)
The CTime, where CTime=amount of seconds since the random event (DTO)

The CTime is based on the Greenwich date and time, where CTime is the time expressed in seconds (8 hex-digits), of the encryption moment minus DT0 (a pseudo-random number different for each device, and referred to as the Random Event). DT0 is randomly selected by the portable device.

In addition, based on the arbitrator seed number, the PM computes the card arbitrator number (CAN) (step 320). The service provider's system administrator has no access to the CAN.

Therefore, five numbers are burned into the portable device:
SM, SDK, CTime (running number), C_ID, and CAN.
Three out the five numbers are specific for the small hand-held device:
C_ID (derived from System Seed Number) (step 315)
CAN (derived from Arb. Seed Number) (step 320)

CT (Card-Time) is incremented each second (variable)
The other two numbers are System specific: the System Modulus (SM) derived from SSN and the System's DES Key.

The small hand-held device computes the identification message in two steps. First, using the function F_ARB where:

F_ARB(CTime,CAN)=R1 (step 325)

R1 is referred as the first result.

The function F_ARB can be selected for each application and does not influence the architecture described here. The method of this invention can be use with several functions but preferably with the function F_ARB, as detailed below.

Following the computation of the first result, the portable device computes a second result R2 as follows:

$F\_Sys_{SM}$(C_ID, CTime, R1)=R2 (step 330)

The function $F\_Sys_{SM}$ can be selected for each application and does not influence the architecture described here. There is an additional third step which comprises the encryption of R2 using DES with a System's DES Key (SDK). This step is optional.

The DES step has been included in order to satisfy certain Bank requirements, in view of Bank standards in use today.

Thus $e_{DES}$(R2)=R'2

R'2 can undergoes some permutations, addition of error correction algorithms and encoding into sound. Next, R'2 is transmitted to the voice browser server (step 335). At the server, the R'2 is decoded into digits, de-permutated, and decrypted using the SDK.

$d_{DES}$(R'2)=R2

Then, the inverse function of $F\_Sys_{SM}$ referred to as $F^{-1}Sys_{SM}$ is applied to R2 as follows:

$F^{-1}Sys_{SM}$(R2)=C_ID, CTime, R1 (step 340)

Having now recovered C_ID, the identification is completed, while the recovery of the CTime authenticates it, if it falls within a predetermined tolerance window, thus avoiding the possibility of fraud by reordering the message and further usage.

Next, the arbitration of a transaction will be discussed. If a specific transaction is disputed by the legitimate buyer, who claims that the transaction was not made with his portable device, the system administrator will supply the independent arbitrator with the card serial number, the transaction CTime, and the transaction R1 (the <<supplied>> R1) (step 345).

The arbitrator, using the arbitrator seed number, will compute the corresponding CAN (step 350) from the Card Serial Number and then compute R1 as follows:

F_ARB(CTime, CAN)=R1 (step 355)

Next, the arbitrator will compare the <<computed>> R1 with the <<supplied>> R1 (step 360). If both R1's are equal, then the transaction was not fabricated by an impostor or by the system administrator.

Obviously, there is no way for an impostor, even for the system administrator, to compute the correct R1 for a specific portable device at a specific time due to the fact that the system administrator does not know the arbitrator seed number.

The transaction data can be encoded, according to the method of this invention, using DES with a variable one-time key.

There are 2 preferred versions: A and B whereas
Version A: the Transaction Data Key (TDK) is computed as a function of the C_ID and CTime
Version B: the Transaction Data Key (TDK) is computed as a function of the CAN and Ctime Therefore, a preferable methodology for identification comprises: the portable device computing:

F_ARB(CT, CAN)=R1
and
F_Sys$_{SM}$(C_ID, CTime, R1)=R2.

Thus e$_{DES}$(R2)=R'2 which is the message sent.

An example of this is to use a Hash algorithm (like the SHA1 or any other) in the following way:

F_ARB(CTime, CAN)=HASH(CTime, CAN)=R1

Where the recommended size of CAN is more than 160 bits.

Second Step (System Related Step)

F_Sys$_{SM}$(C_ID, CTime, R1)=R2=
[(C_ID, CTime) XOR C'], R1=
where C'=HASH(SM, R1) Mod M;
where the recommended M=10,000,000,000,000,000; and
where the recommended size of SM is more than 160 bits.

Actually, R2 may be further DES encrypted (optional step), using a System DES Key (SDK), where e$_{DES}$(R2)=R'2
R'2 is then encoded into sound, and transmitted.

The Identification Server, referred to as the voice browser server, receives R'2 as sound, decodes R'2 and transmits R'2 to the decrypting node preferably located at the certification service facilities. Now the certification service server knowing the System DES Key, SDK, decrypts the DES step recovering R2, where R2=W,R1. The following computations are then performed by the certification service server:

compute HASH(SM,R1) Mod M=C'
compute C' XOR W=C' XOR [(C_ID, CTime) XOR C']=
{HASH(SM, R1) Mod M} XOR [(C_ID, CTime) XOR
{HASH(SM, R1) Mod M}]=(C_ID, CTime)

and with this, the system identifies the portable device and avoids impersonation, due to the CTime tolerance.

Arbitrating a disputed transaction with the method of this invention: assuming a specific transaction is disputed by the <<legitimate caller>> who claims that the transaction was fabricated by the system administrator or a third party. The system administrator will supply the independent arbitrator with the Card serial number, the transaction CTime, and the R1 (the <<supplied>> R1). The arbitrator will compute the corresponding CAN from the Card Serial Number (only the arbitrator can accomplish this step, due to the need for the Arbitrator Seed Number) and then F_ARB(CTime, CAN)=HASH(CTime, CAN)=R1

Next, the arbitrator will compare the <<computed>> R1 with the <<supplied>> R1.

If both R1 are equal, the transaction was not fabricated by the system administrator or by any other entity. Obviously, the system administrator cannot compute the correct R1 for a specific portable device at a specific time as the CAN is not known.

A further variation of the method of this invention, for remote, credit card based, over-the-Internet, transactions originated through the phone and referred to as voice-commerce transactions comprises the following:

First, an arbitrator is selected, as described above, and one or several system administrators as described above. The arbitrator can select the arbitrator seed number, or the arbitrator can select trustees which can select their respective parts of such seed number, according to the method described above. Similarly, the system administrator also selects their respective seed number, preferably according to the method described above.

A multitude of small hand-held devices are prepared, preferably, according to the method described above, and the voice browser server is also prepared, preferably, according to the method described above. For each specific customer or subscriber: issue to each person (the customer), who desires to perform secure, remote credit card based over-the-Internet transactions from a regular phone, as a one time set-up procedure, a small hand-held device personalized as described above, and, obtaining from such person, an authorization to use one or several of his credit cards for paying transactions according with the procedures stated here-below, in a way that a third party, referred as the certification service, will be able, upon the person's request, as specified below, stamp a digital signature on documents (i.e., digitally sign a document) in accordance with the electronic-commerce standards (e.g., PKCS#7). Also, each customer will provide, as a one time procedure, all the necessary data, including name of the customer, credit card numbers, expiration dates, and, if requested, the copies of the respective X.509 certificates of the customer and/or the facsimile of the hand-written signature of the customer to be stamped and used as described below.

Upon initiation of a transaction, the portable device may request a PIN for activation, wherein the portable device allows a limited number of consecutive wrong PINs (say 3 or 10) before auto locking itself. The portable device then computes a new, secure identification code, preferably according to the method described above, when requested (e.g., by pressing a key). The portable device may accept transaction data (i.e., transaction amount, selection of the credit card, etc) locally entered by the customer at the time of the transaction by means of the key-pad of the portable device and, preferably, will encrypt such transaction data. The portable device will encode this secure identification code and the encrypted transaction data to sound, whereas this sound, carrying the dynamic and secure identification code and the encrypted transaction data, is referred to as the acoustic signature.

Next, the customer places a call to a specially designed server (referred to as the voice browser server) able to interpret the customer utterances using speech recognition technologies and text-to speech technologies to read out, for the customer, internet instructions, and use the customer's instructions as WEB-browser instructions for browsing the Internet, and for enabling the performance of Internet transaction through the phone. The customer can browse the Internet by speaking verbal instructions through the phone to the voice browser server and in that manner, the merchant or service provider web-site can be accessed. If, at some point, the customer decides to send a signed document to the merchant/service provider where the document contains the information for completing the performance of a credit card transaction for a specific amount, then the customer enters the specific amount and sends, during the calling session, the acoustic signature through the phone set's microphone as described above. This acoustic signature is converted to an electromagnetic signal at the microphone and is transmitted through the PSTN to the public server (voice browser server). At the voice browser server, the acoustic signature may be recorded and the time of reception of the acoustic signature (referred to as capture time) is registered.

Next, the reverse of the encoding process, referred to as the decoding process (de-codification) is applied to the digitized acoustic signature, and the dynamic and secure identification code and the encrypted transaction data are recovered. The string of digits referred to as the dynamic and secure identification code, the encrypted transaction data, and the time of reception of the acoustic signature or capture time, are encrypted and/or Hashed, preferably, according to the standards and usage of the e-commerce certification authorities such as VPN or SSL (wherein the encrypted string is also referred to as the client query). The client query is transmitted to a third party, the certification service, which decrypts and/ or rechecks the integrity and validity of the client query, thus producing the dynamic and secure identification code and the transaction data. Next, the certification service decrypts, the dynamic and secure identification code, thus identifying the specific portable device (i.e., recuperating the Card-ID and checking the CTime against Impersonation fraud). In addition, the certification service obtains the transaction data by decrypting the encrypted transaction data carried by the client query.

Next, a database is queried in order to determine the owner of the portable device that generated the acoustic signature, or to whom the device is associated. Once the device owner is identified and the transaction data decrypted, the certification service queries a database where the credit card account numbers associated with the portable device and/or customers are stored which can be the same database as where the portable device is associated to the Owner. Optionally, the certification service queries the relevant credit card company for obtaining authorization of the payment, directly or through a point-of sale machine, and/or through any of the companies who serve as clearing houses for Credit card transactions. Once the authorization is obtained from the relevant credit card company, the certification service prepares a digitally signed document, with the necessary data for the completion of the credit card based transaction, including the name of the customer, credit card number, amount, expiration date, and, if requested, the digital X.509 of the customer and/or the digital certificate generated by the certification service, and/or the facsimile of the hand-written signature of the customer, in order to fulfill the credit card companies request of signature-on-file. This digital document is then sent to the merchant/service provider WEB-site for completion of the transaction. If, at some time later, the customer denies or repudiates the transaction, the certification service will appeal to the independent arbitrator according to the method described above, in order to show that the transaction was made by the customer and is not a fabrication of somebody else.

A further variation of this method is, as above, but after, or close to the moment where the small device generates the acoustic signature, the portable device displays a variable string (also referred to as a one-time password) of digits and/or letters which are a mathematical function of some of the seeds or sub-seeds of the dynamic identification code of the acoustic signature in a way that only an entity who can interpret the dynamic identification code of the acoustic signature can compute a one-time password. The certification service server computes the same one-time password, after having identified the portable device(i.e., decrypted the dynamic identification code). The certification service server transmits the one-time password to the merchant/service provider as data, and the one-time password is read out to the customer, using text to speech technologies, in order for the customer to hear the numbers and/or characters and compare with the one-time password read out from the display of the small hand-held device. If both passwords are identical, then it is verified that the correct service provider is accessed, thus avoiding any possibility of a third party impersonating the service provider.

A further improvement of the method of the present invention, is as above, but wherein the one-time password is computed by the certification service and transmitted to the voice browser server, and wherein the one-time password is also encrypted and or hashed using the e-commerce standards for certification, or by using the public key of the service provider as well as the private key of the certification service, in order to avoid any possible impersonation of the service provider.

Referring now to the one-time password generation described above, or to any other time based portable device, a preferred computation of the one-time-password can be as follows:

After sending the acoustic signature the portable device computes an n HEX-digits code and displays it on the portable device's LCD. This code will remain in the LCD for m sec. and will disappear. Any time the portable device holder press a button (referred to as a CODE button), the portable device will display a new one-time-password.

The one-time-password is preferably computed applying the DES algorithm to a function of CTime where the DES key is a function of the C_ID and CTime.

n-k out of the n HEX-digits are a result of this calculation. The other k, preferable k=3, are the last k digits of the CT for synchronization purposes.

The Decryption node, which can be part of the voice browser server, receives the serial number or any other identification of the portable device or any equivalent number in order to extract from the database the Card ID and can know the CTime from the Acoustic signature decryption or can extrapolate a number close to the CTime, from the Capture Time.

By means of the last k digits of the CTime, the decryption node can exactly determine the true transaction CTime.

The Server can now compute the other n-K digits of the One-Time-Password applying the DES algorithm to a function of CTime where the DES key is the specific function of C_ID and CTime mentioned above.

In accordance with the present invention, the portable device encrypts, using the D.E.S. algorithm, the result of the device's specific function of time, by using a (device's specific) key.

Assume that each device has
1—a specific function of the time $\underline{fn}(t)=(f1, \ldots f8)$, and
2—a Key Kn, and
3—$e_K(a)$ means encrypting "a" by using the DES algorithm and
4—that underline R means a vector=(R1, . . . , Rn)
5—t is the date and time (GMT)
thus, $\underline{R}=e_{Kn}(\underline{fn}(t))$ Now the device owner sends or writes identification data such as his name or the device serial number, the one-time-password and the time and date.

Therefore the authentication info, preferably includes the time and date "t", a Serial Number (SN) and a Dynamic Code (DC) 8 characters long which is read on the token display:
$\underline{DC}=DC1, \ldots, DC8$
wherein:
DC1=R12
DC2=f6
DC3=R14
DC4=f8
DC5=R13
DC6=R16
DC7=f7
DC8=R15

The decryption node has a database which includes for each token

SN, Kn, fn of the last transaction (referred to as the parameters) when the authentication message is received, the decryption node retrieves the corresponding Kn from a database and extrapolates the fn(t)=f1, . . . , f8 using the time of the transaction "t", wherein:
replace f6 by DC2
replace f7 by DC7
replace f8 by DC4 in order to determine the exact time used by the small hand-held device for the computation of the one-time-password.

Now the decryption Node computes $R' = e_{Kn}(f1, \ldots, f8)$ and finally, compares R'12 with DC1

R'14 with DC3

R'13 with DC5

R'16 with DC6

R'15 with DC8.

In summary, the decryption node can recuperate, rebuild or re-compute the true one-time-password.

One advantage of this methodology is to avoid the server impersonation fraud as described above.

Another advantage of this method is the certification of the identity of the signor of any hand-written signature stamped on any document.

After a person (the signor) activates his small hand-held device, and identities itself against the device by entering the correct PIN, and pressing the code button, then the portable device will display the one-time-password and the signor should write the one-time-password on the document, together with the time and date and identification information like the signor's name, login name, or serial number of the small hand-held device, or any other info which will help the decryption node to query the database and proceed as described above, thus checking the veracity and validity of such one-time-password at the presumed time of generation by the presumed small hand-held device.

U.S. Pat. No. 5,742,684 issued to the inventor of this invention describes a possible example of the portable device.

Although the invention has been described herein using exemplary implementations, it should be clear that any other implementation of the methodology presented here does not represent a departure from the spirit of the invention as set forth here. The same is stated here for alterations of the sequential order of the steps or sub-steps used to explain the methodology presented.

Various modifications in the selection and arrangement of the various steps discussed herein may be made without departing from the spirit of the invention as set forth above.

What is claimed is:

1. A method for signing a document by a holder of a portable device, comprising the steps of:
    computing a one time password at the portable device, wherein the one time password is a function of a time information;
    replacing a portion of the one time password with a time indicia; and
    writing the one time password on the document.

2. The method of claim 1 further comprising the step of authenticating the holder to the portable device.

3. The method of claim 1 further comprising the step of writing a date and a time on the document.

4. The method of claim 1 further comprising the step of writing an indicia of the holder's identity on the document.

5. The method of claim 1 further comprising the step of stamping a signature of the holder on the document.

6. The method of claim 1 further comprising the steps of:
    querying a database, by a decryption node, for an indicia of the portable device's keys; and
    checking the validity of the computed one time password to determine if the document has been properly signed.

7. A method for corroboration of the authenticity of a signature in a document, wherein the signature belongs to a holder of a portable device, comprising the steps of:
    authenticating the holder to the portable device;
    computing a one time password at the portable device, wherein the one time password is a function of a time information;
    replacing a portion of the one time password with a time indicia; and
    writing the one time password on the document.

8. The method of claim 7 further comprising the steps of:
    querying a database, by a decryption node, for an indicia of the holder's identity, wherein the indicia of the holder's identity appears in the document;
    identifying the portable device by using the holder's identity;
    checking the validity of the computed one time password to determine if the signature is authentic.

9. A method for corroboration of the authenticity of an identity of a person in a document, wherein the identity belongs to a holder of a portable device, comprising the steps of:
    authenticating the holder to the portable device;
    computing a one time password at the portable device, wherein the one time password is a function of a time information;
    replacing a portion of the one time password with a time indicia; and
    writing the one time password on the document.

10. The method of claim 9 further comprising the step of conventionally signing the document by the holder of the portable device.

11. The method of claim 9 further comprising the steps of:
    querying a database, by a decryption node, for an indicia of the holder's identity;
    identifying the portable device by using the holder's identity;
    checking the validity of the computed one time password to determine if the holder's identity is authentic.

12. A method for corroboration of the authenticity of the identity of a signor of a document, wherein the signor has a portable device configured to generate time dependent one-time passwords corresponding to any given date and time, comprising the steps of:
    conventionally signing the document by the signor;
    authenticating the signor to the portable device;
    generating a one time password at the portable device, wherein the one time password is a function of a time information;
    replacing a portion of the one time password with a time indicia; and
    writing the one time password in the document.

13. The method of claim 12 further comprising the step of adding to the document an indicia of the time and date of the generation of the one time password.

14. A method for validating a check of an account owner in addition to conventional check validation, wherein the account owner is a holder of a portable device and wherein the check has a date, comprising the steps of:
    computing a one time password at the portable device, wherein the one time password is computed on the date of the check, and wherein the one time password is a function of a time information;

replacing a portion of the one time password with a time indicia; and stamping the one time password on the check.

15. The method of claim 14 further comprising the steps of:

querying a database, by a decryption node, for an indicia of the account owner's identity;

identifying the portable device by using the account owner's identity; and checking the validity of the computed one time password to determine if the check is valid.

* * * * *